(12) United States Patent
Lupo et al.

(10) Patent No.: US 6,504,042 B1
(45) Date of Patent: * Jan. 7, 2003

(54) USE OF SPIRO COMPOUNDS AS MATERIALS IN NON-LINEAR OPTICS

(75) Inventors: Donald Lupo, Frankfurt (DE); Josef Salbeck, Kelkheim (DE)

(73) Assignee: Hoechst Aktiengesellschaft, Frankfurt am Main (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/728,780

(22) Filed: Oct. 10, 1996

(30) Foreign Application Priority Data

Oct. 12, 1995 (DE) .......................... 195 37 969

(51) Int. Cl.⁷ ................................. G02F 1/35
(52) U.S. Cl. ...................... 558/46; 385/122; 385/143
(58) Field of Search ............... 558/46; 385/122, 385/143

(56) References Cited

U.S. PATENT DOCUMENTS 5,026,894 A * 6/1991 Tour .............................. 558/46

5,621,131 A * 4/1997 Kreuder ........................ 558/46

FOREIGN PATENT DOCUMENTS

WO   WO 94/12910   6/1994
WO   WO 94/20881   9/1994

OTHER PUBLICATIONS

G.J. Stegeman et al., Nonlinear Optical Effects in Organic Polymers, (1989), p. 257.
G.H. Cross, Princi and Appl. of Nonlinear Optical Materials, (1993), p. 189.
D. Neher, Adv. Mater, vol. 7, No. 8, (1995).

* cited by examiner

*Primary Examiner*—Robert Gerstl
(74) *Attorney, Agent, or Firm*—Frommer Lawrence & Haug

(57) ABSTRACT

Spiro compounds of the formula I

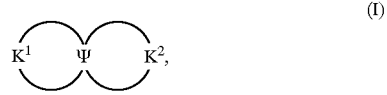

in which $\psi$ is C, Si, Ge or Sn and $K^1$ and $K^2$ independently of one another are conjugated systems, are suitable as materials in nonlinear optics.

1 Claim, No Drawings

USE OF SPIRO COMPOUNDS AS MATERIALS IN NON-LINEAR OPTICS

RELATED APPLICATION

This application claims priority to German Application No. 19537969.1, filed Oct. 12, 1995, incorporated herein by reference.

BACKGROUND OF THE INVENTION

1. Field of the Invention

The invention relates to the use of soluble, amorphous, conjugated spiro-linked oligomers and polymers as materials for nonlinear optics. It furthermore relates to optical beam guides (waveguides) which are made from these compounds or comprise them and exhibit non-linear optical effects, and to non-linear optical structural elements (components) which are based on such beam guides.

2. Description of the Related Art

Several publications are referenced in this application. These references describe the state of the art to which this invention pertains, and are incorporated herein by reference.

The term "non-linear optics" describes phenomena, and application thereof, which chiefly occur during interaction between high light intensities or high electric field strengths and specific materials. These effects are based on the polarization of matter by an electric field. This can be represented in a power series:

$$P = \chi^{(1)}E + \chi^{(2)}E^2 + \chi^{(3)}E^3 + \ldots$$

The $\chi^{(n)}$ are the so-called electric susceptibility functions. E is the electric field and can comprise several frequency components and may therefore be made up of light or a voltage or a combination thereof. The susceptibility is linked to the so-called molecular hyperpolarizability:

$$\chi^{(2)} \sim N\beta; \quad \chi^{(3)} \sim N\gamma,$$

in which N is the density of the active molecules and $\beta$ and $\gamma$ represent the hyperpolarizabilities of the 2nd and 3rd order. The susceptibilities usually decrease with increasing potency, and non-linear optical (NLO) effects therefore become visible only at high field strengths. Furthermore, all susceptibilities of an even order are zero if the individual molecules are arranged centrosymmetrically in the material or the molecules themselves show inversion symmetry.

Effects of the 3rd order, which also occur in systems with inversion symmetry, are, for example, the 4-wave mixture in which light rays having three different frequencies form one light ray having a fourth frequency. The degenerate 4-wave mixture in which all 4 rays have the same frequency is of particular interest for applications. This leads to the so-called optical Kerr effect, in which the refractive index of the material depends not only on the wavelength but also on the intensity of the light ray. On the basis of the Kerr effect, real-time holograms can be established, or purely optical circuit elements which could be suitable for use in optical computers can be developed.

For optical circuit elements in particular, it is advantageous and often necessary for the NLO-active materials to be employed as beam guides either in a light-conducting fiber or as a planar waveguide on a substrate. On the one hand, a waveguide arrangement allows the construction of integrated optical structural elements, and on the other hand the waveguide has the effect that the light intensity and therefore the field strength remain high over a longer path and the NLO effects are greater. However, this can only be achieved if the optical losses in the waveguide which occur due to absorption and light scattering are as small as possible. Examples of structural elements based on NLO-active beam guides are opto-optical couplers, Mach-Zehnder interferometers, mode-selective couplers and prism couplers, which can be employed in communications technology or for optical computers. The invention relates to these and other structural elements and applications, which are described, for example, by G. Stegeman et al. in *Non-linear Optical Effects in Organic Polymers*, pages 257–276 (Dordrecht: Kluwer, 1989), using conjugated spiro compounds, but is not limited to these structural elements and applications mentioned.

Beam guides can be employed appropriately for applications in non-linear optics only if the optical losses which occur due to absorption and light scattering are as low as possible. An ideal material for use in NLO of the 3rd order should absorb as little as possible at the desired use wavelength, and should also have a homogeneous, preferably an amorphous, structure, in order to prevent light scattering. Furthermore, the material should be readily processible and optically, chemically and thermally stable.

For effects of the 3rd order, conjugated polymers and oligomers, for example poly(phenylenevinylene), poly (diacetylene) or sexi(thiophene), have proven to be interesting materials having relatively high susceptibilities of the 3rd order. Examples of conjugated organic materials for non-linear optics of the 3rd order are described by G. H. Cross in *Nonlinear Optical Materials*, pages 189–225 (London: Blackie Academic and Professional, 1993) and by D. Neher in *Advan. Mater.*, 7, 8, pages 691–702 (1995). The substances available to date cannot fulfill all the above-mentioned conditions at the same time. Many of the compounds, for example poly(thiophenes), poly(anilines) or poly(phenylenevinylenes), are intensely colored and are therefore unsuitable for waveguides in the visible range. Poly(arylenevinylenes) furthermore are often sensitive to oxygen and light. Conjugated polymers and oligomers moreover are usually insoluble or poorly soluble, and are therefore difficult to process from solution using typical coating processes, and often form polycrystalline, light-scattering layers. This applies in particular to colorless compounds such as, for example, poly(phenylenes). However, the method frequently used of increasing the solubility and suppressing crystallization with long-chain substituents is accompanied by a dilution of the active units and a reduction in NLO susceptibility. Furthermore, the mechanical stability of the films is impaired as a result.

OBJECTS OF THE INVENTION

It is an object of the present invention to develop a method of using a spiro compound as materials for non-linear optics which improves the solubility, stability, achives good non-linearly optical activity, low optical losses and avoids the disadvantages of problems mentioned.

It is also an object of the present invention to provide a non-linearly optical structural element, which comprises or consists of a monomeric or polymeric spiro compound as described above. Preferably, non-linearly optical effects of the third order are exploited in this structural element.

It is yet an object of the present invention to provide a non-linearly optical structural element, which comprises an optical waveguide comprising or consisting of a monomeric or polymeric spiro compound as described above. Preferably this non-linearly optical structural element is an opto-optical coupler, a Mach-Zehnder interferometer, a mode selective coupler or a prism coupler.

SUMMARY OF THE INVENTION

It has been found, surprisingly, that the monomeric and polymeric spiro and heterospiro compounds described below are particularly suitable as materials for non-linear optics, since they do not have the above-mentioned disadvantages because they are soluble, stable and amorphous substances and at the same time have a good non-linearly optical activity and low optical losses. In the context of this application the term "spiro compound" includes monomeric and polymeric carbo spiro and hetero spiro compounds.

Accordingly, an aspect of the invention relates to the use of spiro compounds of the formula (I),

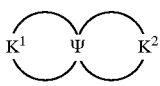
(I)

in which ψ is C, Si, Ge or Sn, preferably C, Si or Ge, more preferably C or Si, and in particular C, and $K^1$ and $K^2$ independently of one another are conjugated systems, as materials in non-linear optics.

DETAILED DESCRIPTION OF THE INVENTION

Spirocompounds are compounds in which two ring systems are linked by a single tetravalent atom. This atom is referred to as a spiro atom, as explained in *Handbook of Chemistry and Physics*, 62nd edition (1981–2), CRC Press, pages C-23 to C-25.

Preferred compounds of the formula (I) are 9,9'-spirobifluorene derivatives of the formula (II),

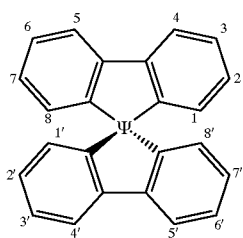
(II)

in which ψ has the above-mentioned meanings, and in which the benzo groups can be substituted and/or fused independently of one another.

Particularly preferred compounds are spirobifluorene derivatives of the formula (III),

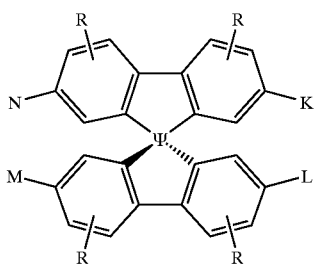
(III)

in which the symbols and indices have the following meanings:

ψ is C, Si, Ge or Sn, preferably C, Si or Ge, particularly preferably C or Si, in particular C, K, L, M and N are identical or different and are a group of the formulae

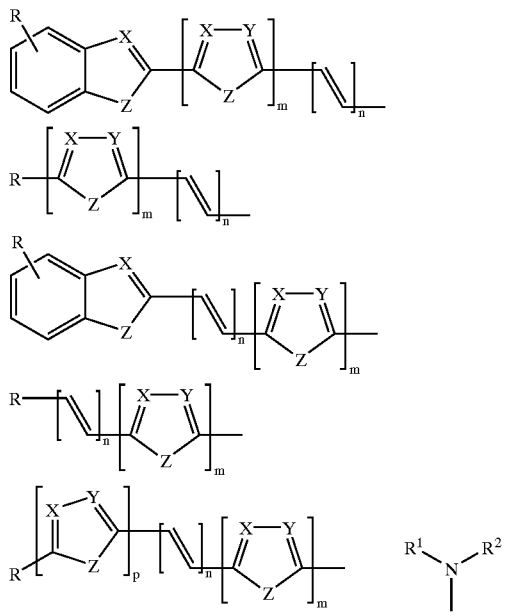

R has the same meaning, identical or different, as K, L, M and N, or is hydrogen, a linear or branched alkyl, alkoxy, sulfide, sulfonyl or carboalkoxy group having 1 to 22, preferably 1 to 15, particularly preferably 1 to 12, carbon atoms, —CN, —$NO_2$, halogen, —$NR^1R^2$, —Ar or —O—Ar;

Ar is phenyl, biphenyl, 1-naphthyl, 2-naphthyl, 2-thienyl or 2-furanyl, where each of these groups can carry one or two radicals R;

m, n and p are 0, 1, 2 or 3;

X and Y are =CR— or =N—;

Z is —O—, —S—, —NR—, —CRR—, —CH=CH— or —CH=N—; and $R^1$ and $R^2$ are hydrogen, a linear or branched alkyl group having 1 to 22 C atoms, —Ar or 3-methylphenyl.

Preferred compounds of the formula (III) are those of the formulae (IIIa)–(IIIg) IIIa) K=L=M=N and is a group of the formulae:

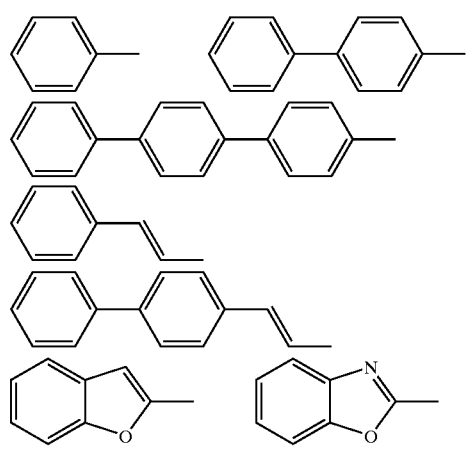

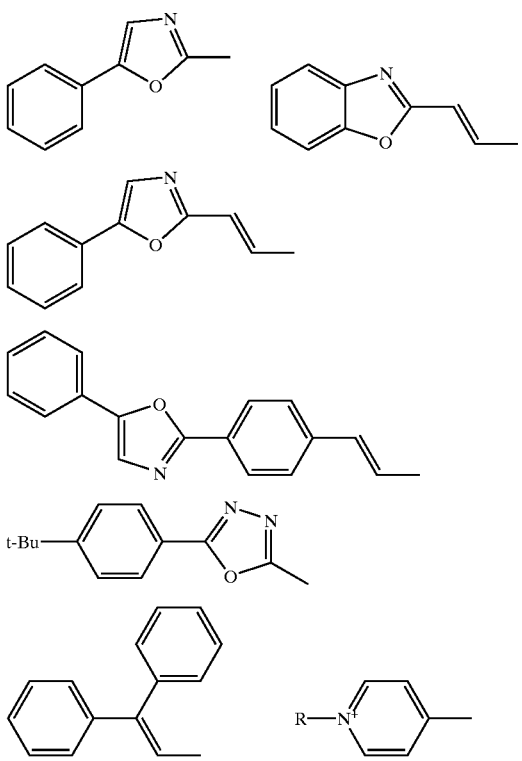
R=C$_1$–C$_{22}$-alkyl or C$_2$H$_4$SO$_3$–
IIIb) K=M=H and N≡L and is a group of the formulae:
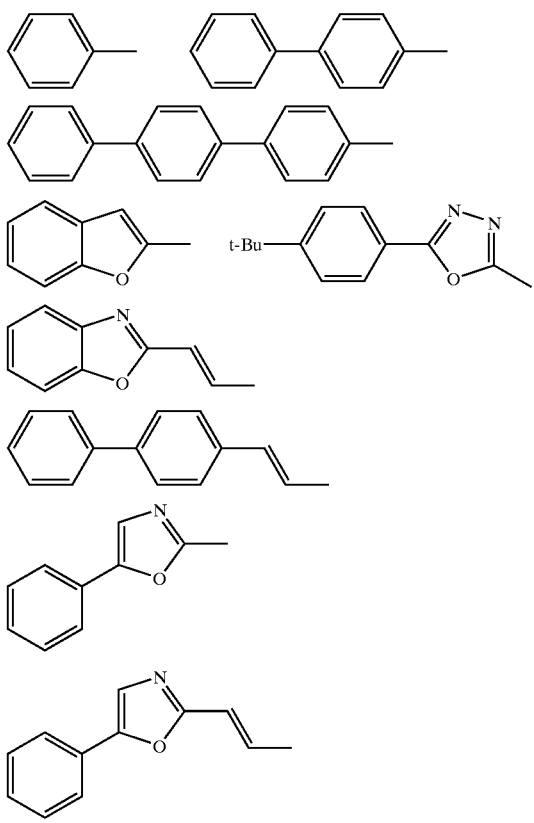
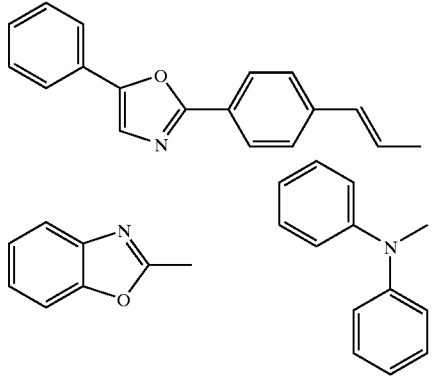
IIIC, K=M and is a group of the formulae:
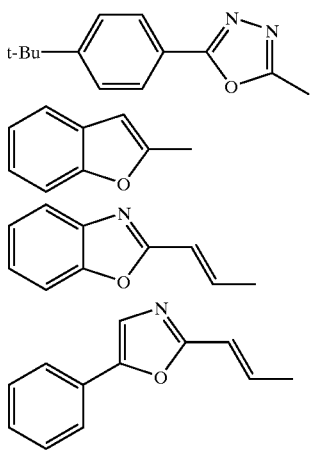
R = C$_1$—C$_{22}$—alkyl or C$_2$H$_4$SO$_3^-$
and N≡L and is a group of the formulae:

-continued
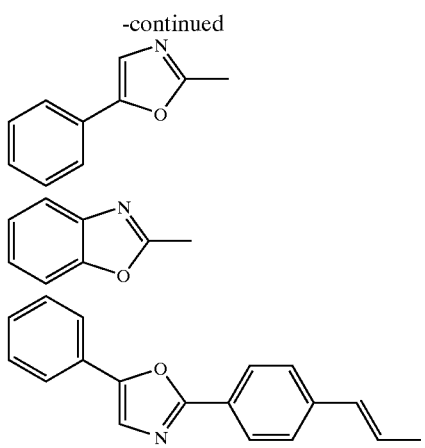
IIId) K=M and is a group of the formulae:
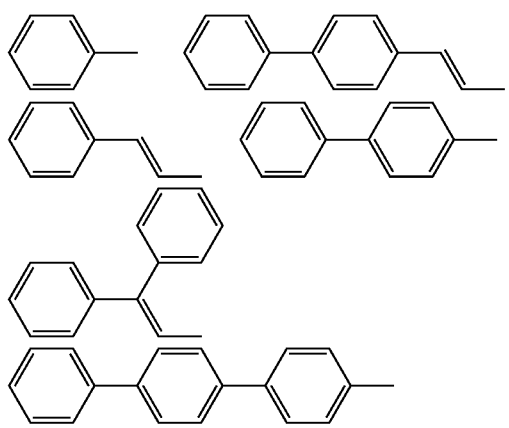
and N≡L and is a group of the formulae:
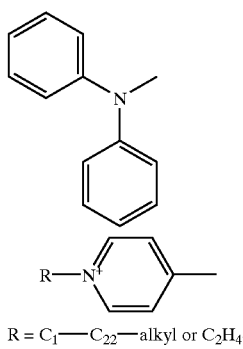
R = C$_1$—C$_{22}$—alkyl or C$_2$H$_4$SO$_3^-$
IIIe) K=L=H and M=N and is a group of the formulae:
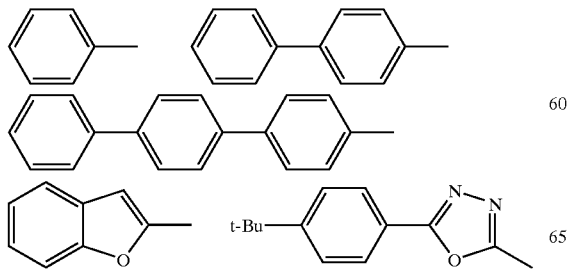
-continued
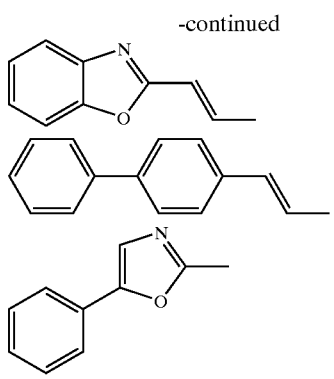
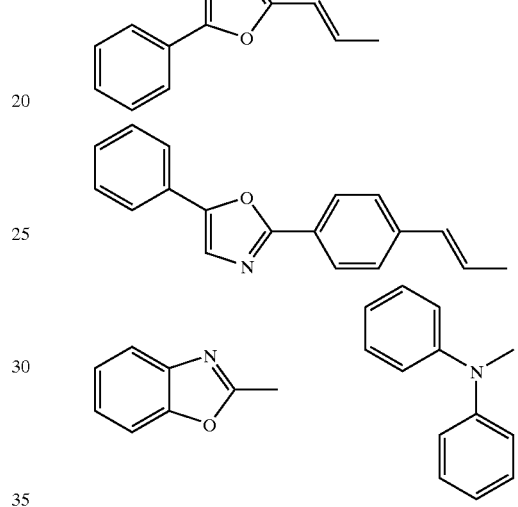
IIIf) K=L and is a group of the formulae:
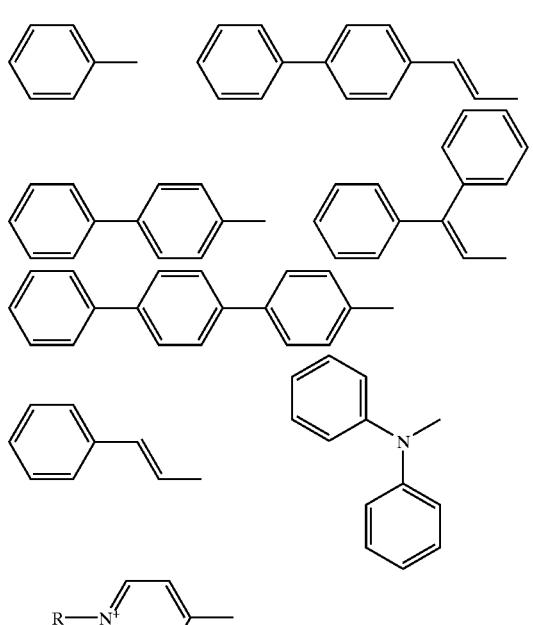
R = C$_1$—C$_{22}$—alkyl or C$_2$H$_4$SO$_3^-$ and M=N and is a group of the formulae:

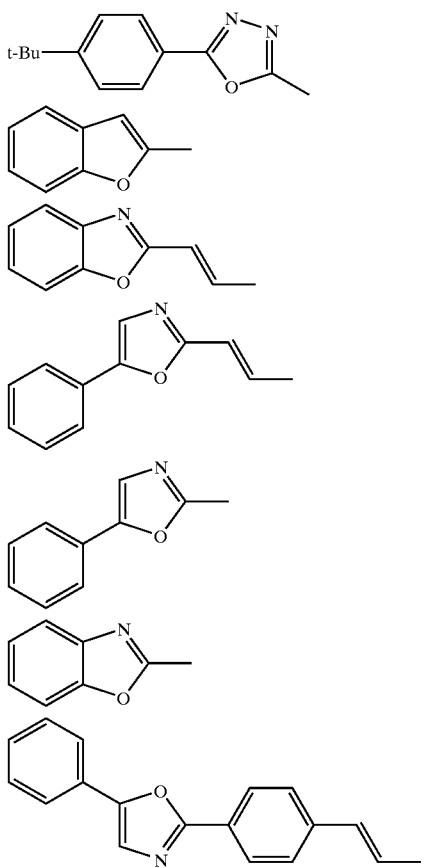

IIIg) K=L and is a group of the formulae:

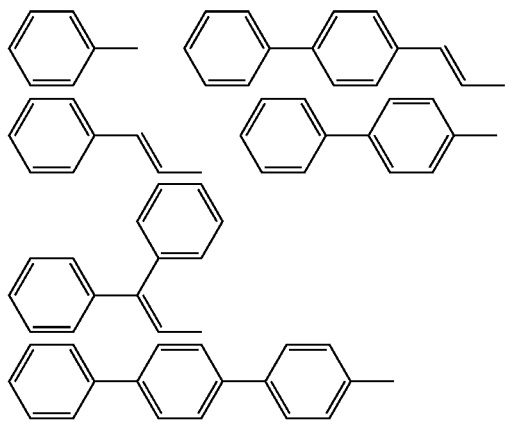

and M=N and is a group of the formulae:

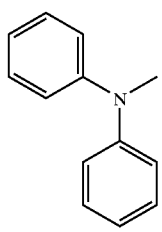

-continued

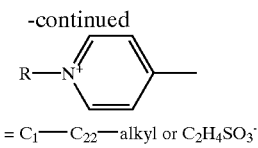

R = $C_1$—$C_{22}$—alkyl or $C_2H_4SO_3^-$

Particularly preferred compounds of the formula (III) are those of the formulae (IIIaa) to (IIIdb):

(IIIaa) K=L=M=N and is a group of the formulae:

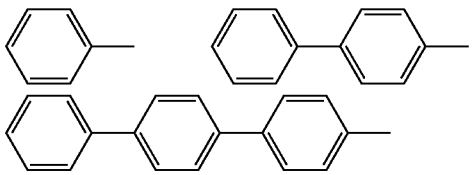

(IIIba) K=M=H and N=L and is a group of the formulae:

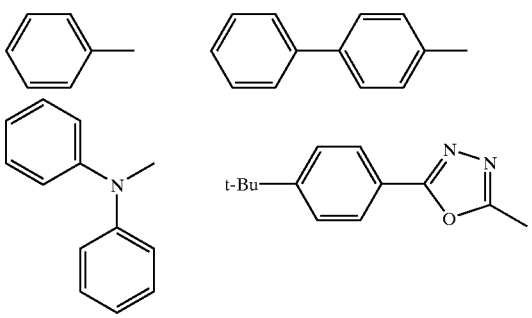

(IIIca) K=M and is a group of the formulae:

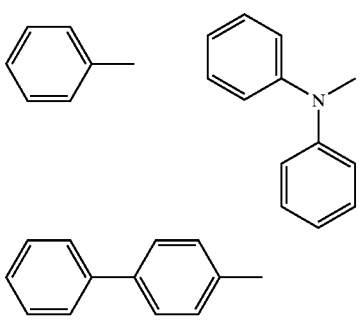

and N=L and is:

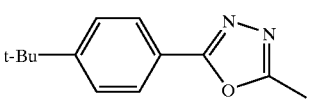

(IIIda) K=M and is a group of the formulae:

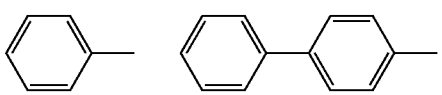

and N=L and is:

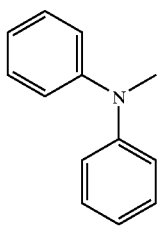

(IIIab) K=L=M=N and is a group of the formulae:

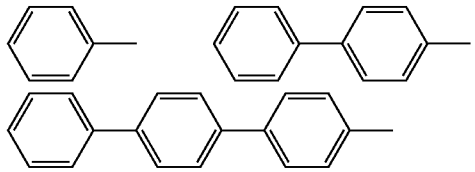

(IIIbb) K=L=H and M=N and is a group of the formulae:

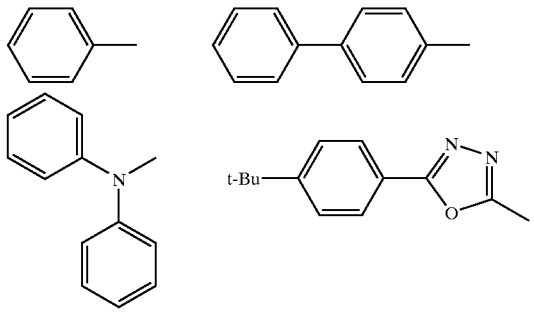

(IIIcb) K=L and is a group of the formulae:

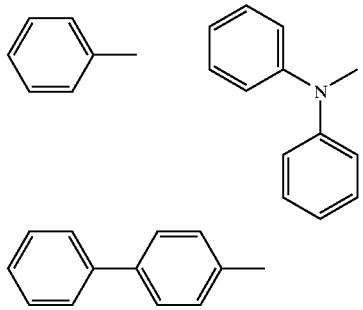

and M=N and is:

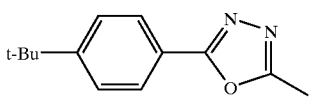

(IIIdb) K=L and is a group of the formulae:

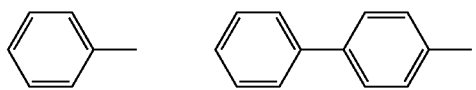

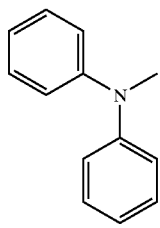 and M = N and is:

Especially preferred spiro compounds are those of the formula (IV),

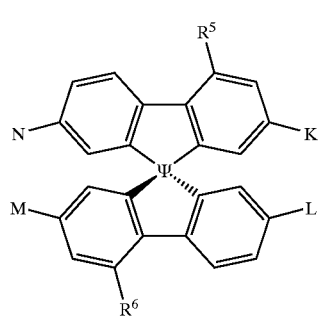

(IV)

in which the symbols have the following meanings:

ψ is C or Si, preferably C;

K, L, M and N are identical or different and are one of the groups G1 to G14:

G1

G2

G3

G4

G5

G6

G7

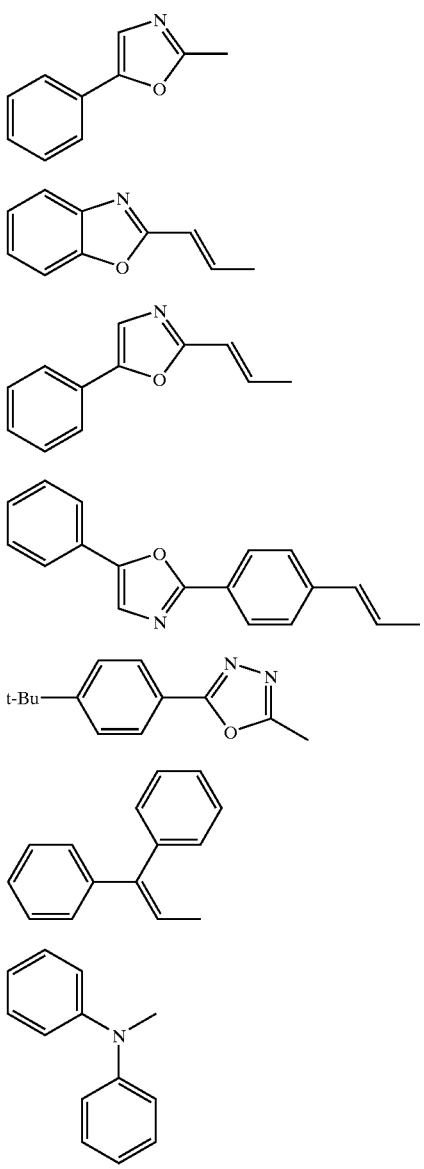

and $R^5$ and $R^6$ are, identical or different, hydrogen, a linear or branched alkyl, alkyloxy or ester group having 1 to 22 C atoms, —CN or —NO$_2$.

Particularly preferred Spiro compounds of the formula (IV) are 2,2',4,4',7,7'-hexakis(biphenylyl)-9,9'-spirobifluorene,
2,2',4,4',7,7'-hexakis(terphenylyl)-9,9'-spirobifluorene,
2,2',4,4'-hexakis(biphenylyl)-9,9'-spirobi-9-silafluorene and
2,2',4,4',7,7'-hexakis(terphenylyl)-9,9'-spirobi-9-silafluorene.

The spiro and heterospiro compounds used according to the invention are prepared by methods known per se, such as are described in EP-A-0 676 461 and in standard works on organic synthesis, for example Houben-Weyl, Methoden der Organischen Chemie [Methods of Organic Chemistry], Georg-Thieme-Verlag, Stuttgart and in the corresponding volumes of the series The Chemistry of Heterocyclic Compounds, A. Weissberger and E. C. Taylor (editors).

The preparation is carried out here under reaction conditions which are known and suitable for the reactions mentioned. It is also possible to use in these reactions variants which are known per se but are not mentioned here in more detail.

a) Spiro Compounds

Compounds of the formula (III) are obtained, for example, from 9,9'-spirobifluorene, the synthesis of which is described, for example, by R. G. Clarkson, M. Gomberg, *J. Am. Chem. Soc.*, 1930, 52, 2881.

Compounds of the formula (IIIa) can be prepared, for example, starting from a tetrahalogenation in positions 2,2', 7,7' of 9,9'-spirobifluorene and a subsequent substitution reaction (cf., for example, U.S. Pat. No. 5,026,894), or via tetraacetylation of positions 2,2',7,7' of 9,9'-spirobifluorene with subsequent C—C linking after conversion of the acetyl groups into aldehyde groups, or build-up of heterocyclic radicals after conversion of the acetyl groups into carboxylic acid groups.

Compounds of the formula (IIIb) can be prepared, for example, analogously to those of the formula IIIa, the stoichiometric ratios in the reaction being chosen such that positions 2,2' and 7,7' are functionalized (cf., for example, J. H. Weisburger, E. K. Weisburger, F. E. Ray, *J. Am. Chem. Soc.*, 1959, 72, 4253; F. K. Sutcliffe, H. M. Shahidi, D. Paterson, *J. Soc. Dyers Colour*, 1978, 94, 306 and G. Haas, V. Prelog, *Helv. Chim. Acta*, 1969, 52, 1202).

Compounds of the formula (IIIc) can be prepared, for example, via dibromination in the 2,2'-position and subsequent diacetylation in the 7,7' position of 9,9'-spirobifluorene, and subsequent reaction analogously to that of the compounds (IIIa).

Compounds of the formulae (IIIe)-(IIIg) can be prepared, for example, by choosing suitably substituted starting compounds when building up the spirobifluorene, for example 2,7-dibromospirobifluorene can be built up from 2,7-dibromofluorenone and 2,7-dicarbethoxy-9,9-spirobifluorene can be built up by using 2,7-dicarbethoxyfluorenone. The free 2',7'-positions of the spirobifluorene can then be further substituted independently.

For synthesis of the groups K, L, M and N, reference may be made, for example, to DE-A 23 44 732, 24 50 088, 24 29 093, 25 02 904, 26 36 684, 27 01 591 and 27 52 975 for compounds with 1,4-phenylene groups; DE-A 26 41 724 for compounds with pyrimidine-2,5-diyl groups; DE-A 40 26 223 and EP-A 03 91 203 for compounds with pyridine-2, 5-diyl groups; DE-A 32 31 462 for compounds with pyridazine-3,6-diyl groups; and N. Miyaura, T. Yanagi and A. Suzuki, *Synthetic Communications*, 1981, 11, 513 to 519; DE-A 39 30 663,; M. J. Sharp, W. Cheng, V. Snieckus, *Tetrahedron Letters*, 1987, 28, 5093; G. W. Gray, *J. Chem. Soc. Perkin Trans II*, 1989, 2041 and *Mol. Cryst. Liq. Cryst.*, 1989, 172, 165; *Mol. Cryst. Liq. Cryst.*, 1991, 204, 43 and 91; EP-A 0 449 015; WO 89/12039; WO 89/03821; and EP-A 0 354 434 for direct linkage of aromatics and heteroaromatics.

The preparation of disubstituted pyridines, disubstituted pyrazines, disubstituted pyrimidines and disubstituted pyridazines is to be found, for example, in the corresponding volumes of the series *The Chemistry of Heterocyclic Compounds*, A. Weissberger and E. C. Taylor (editors).

b) Heterospiro Compounds

Such compounds of the formula (III) are obtained, for example, starting from bis[biphenyl-2,2'-diyl]silane(=9,9'-spirobi(9H-)-silafluorene) (V), the synthesis of which is described, for example, by H. Gilman, R. D. Gorsich, *J. Am. Chem. Soc.*, 1958, 80, 3243.

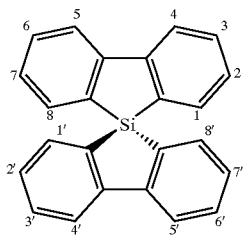

(V)

The heterospiro compounds of the formula (IIIa) can be prepared, for example, starting from a tetrahalogenation in positions 2,2',7,7' of 9,9'-spirobi-9-silafluorene and a subsequent substitution reaction, which is known for analogous C-spiro compounds (cf., for example, U.S. Pat. No. 5,026,894), or via tetraacetylation of positions 2,2',7,7' of 9,9'-spirobi-9-silafluorene with subsequent C—C-linkage after conversion of the acetyl groups into aldehyde groups or build-up of the heterocyclic radical after conversion of the acetyl groups into carboxylic acid groups.

Compounds of the formula (IIIb) can be prepared, for example, analogously to those of the formula (IIIa), the stoichiometric ratios in the reaction being chosen such that positions 2,2' and 7,7' are functionalized (cf., for example, J. H. Weisburger, E. K. Weisburger, F. E. Ray, *J. Am. Chem. Soc.,* 1959, 72, 4253; F. K. Sutcliffe, H. M. Shahidi, D. Paterson, *J. Soc. Dyers Colour,* 1978, 94, 306 and G. Haas, V. Prelog, *Helv. Chim. Acta,* 1969, 52, 1202).

Compounds of the formula (IIIc) can be prepared, for example, via dibromination in the 2,2'-position with subsequent diacetylation in the 7,7'-position of 9,9'-spirobi-9-silafluorene and subsequent reaction analogously to that of the compounds (IIIa).

Compounds of the formulae (IIIe)-(IIIg) can be prepared, for example, by choosing suitably substituted starting compounds in building up the spirosilabifluorene in accordance with the following two equations:

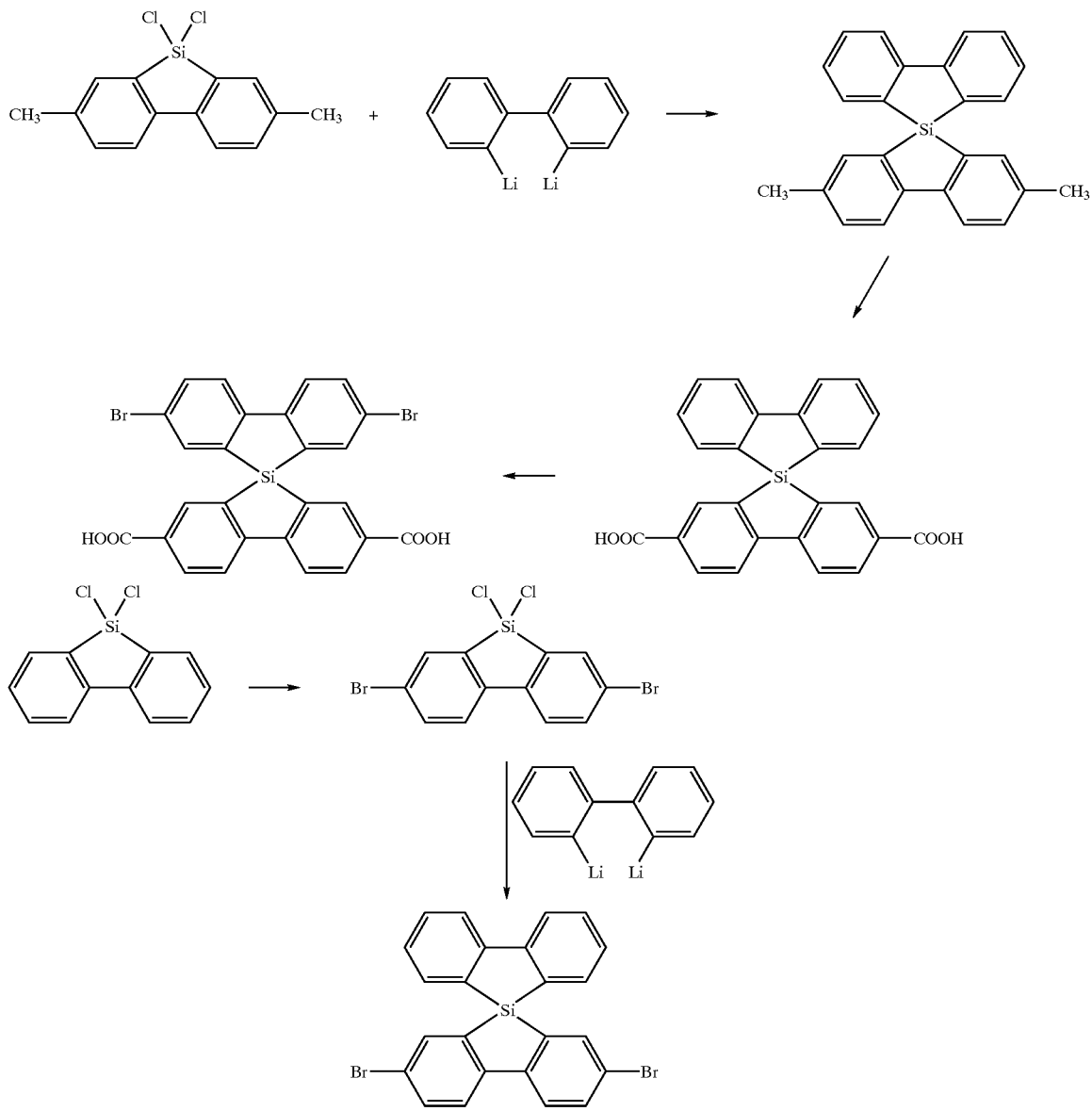

Furthermore, the synthesis sequences with which the expert is familiar, such as nitration, reduction, diazotization and the Sandmeyer reaction, can also be employed. Reference is made to the corresponding C-spiro compounds for synthesis of the groups K, L, M and Q.

A further aspect of the invention is the use of conjugated polymers, comprising repeating units of the formula (VI), as materials in non-linear optics,

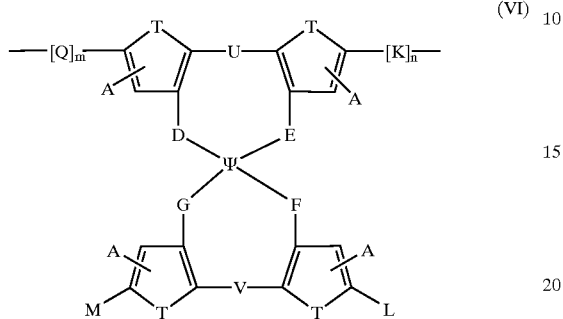
(VI)

wherein the symbols and indices in formula (VI) have the following meanings:

ψ is Sn, Ge, Si or C, particularly preferably C or Si, especially preferably C;

D, E, F and G are identical or different and are —CR$^1$R$^2$—, —O—, —S—, —NR$^3$— or a chemical bond; in which R$^1$, R$^2$ and R$^3$ are C$_1$–C$_{20}$-alkyl or H, and in which R$^1$ and R$^2$ together can form an optionally substituted cycloalkyl ring;

U is —CR$^4$=CR$^5$— or a chemical bond;

V has the meaning of U or is —CR$^1$R$^2$—, —O—, —S—, —NR$^3$—, —SiR$^1$R$^2$—, —SO$_2$—, —SO— or —CO—, in which R$^1$, R$^2$ and R$^3$ have the above-mentioned meaning and R$^4$ and R$^5$ have the meaning of R$^1$, R$^2$ and R$^3$ or are fluorine or CF$_3$;

A is hydrogen, C$_1$–C$_{20}$-, preferably C$_1$–C$_{15}$-alkyl, which can also contain heteroatoms, such as —O—, —N or fluorine, particularly preferably a linear, branched or ring-containing alkyl, alkoxy or alkyloxycarbonyl group, —CF$_3$, —CN, —NO$_2$, —NR$^6$R$^7$, —Ar or —O—Ar;

R$^6$ and R$^7$ are hydrogen or a C$_1$–C$_{20}$-hydrocarbon radical, which can be aliphatic, aromatic, linear, branched or alicyclic, in which R$^6$ together with R$^7$ can form a ring, R$^6$ and R$^7$ are preferably methyl, ethyl, t-butyl, cyclohexyl, 3-methylphenyl or, together,

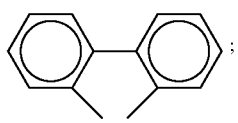;

Ar is an aromatic radical having up to 22 carbon atoms, preferably phenyl, biphenyl, 1-naphthyl, 2-naphthyl, 2-thienyl or 2-furanyl, where each of these groups Ar can carry one or two radicals having the meaning of A;

T is —O—, —S—, —NR$^3$—, —CR$^1$R$^2$—, —CH=N—, —CA=CA—, —CH=CA—, —CH=CF— or —CF=CF—, in which R$^1$, R$^2$, R$^3$ and A have the above-mentioned meaning, T is preferably —CH=CH—; and K, L, M and Q are identical or different hydrocarbon radicals which contain conjugated electron systems and can contain heteroatoms, where K, L, M and Q, with the particular groups A in the ortho-position, can also be closed together to form a ring, which is saturated, partly unsaturated or unsaturated to the maximum degree, a fused aromatic ring system preferably being present in those cases, L, M can also be H, a non-conjugated hydrocarbon radical, preferably containing 1 to 20 carbon atoms, which can contain hetero atoms, halogen, CN, NO$_2$, an amino, alkylamino or dialkylamino group.

Preferred polymers are conjugated polymers comprising repeating units of the formula (VII),

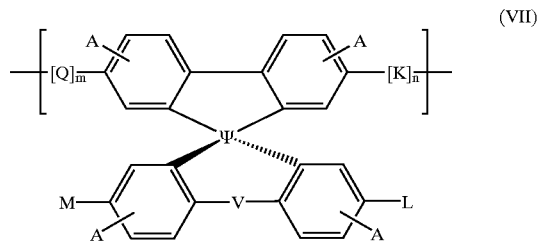
(VII)

in which the symbols and indices have the following meaning:

ψ is Sn, Ge, Si or C;

Q, K, L and M are identical or different, in each case one to fifteen identical or different arylene and/or heteroarylene and/or vinylene groups, which can optionally be substituted, L, M can also be H, a non-conjugated hydrocarbon radical, preferably containing 1 to 20 carbon atoms, which can contain hetero atoms, halogen, CN, NO$_2$, an amino, alkylamino or dialkylamino group;

A is as defined for formula VI; and m and n are 0 or 1.

The polymers of the formula (VI) and (VII) in general have 2 to 1000, preferably 2 to 500, particularly preferably 2 to 100, recurring units.

Preferred polymers are furthermore those in which the symbols and indices in the formula (VII) have the following meanings:

A is identical or different and is R$^1$, R$^2$, R$^3$ and/or R$^4$;

Q and K are identical or different and are conjugated C$_2$ to C$_{100}$ hydrocarbon radicals, in particular groups of the formulae

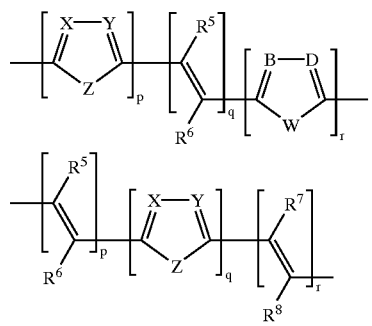

-continued

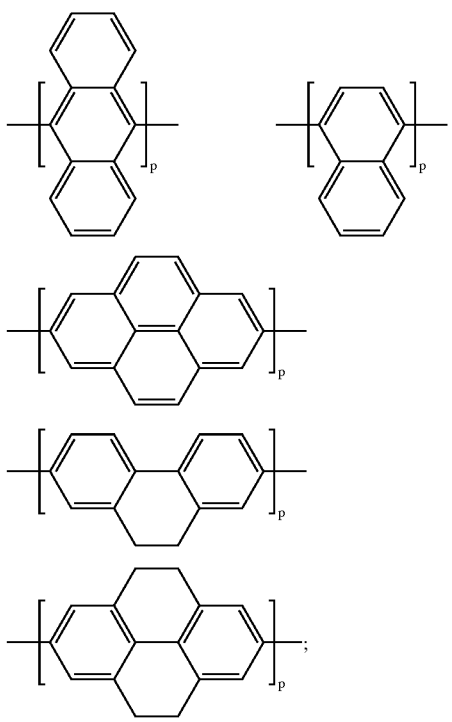

X, Y, B and D are identical or different and are CR$^5$ or N;

Z and W are identical or different and are —O—, —S—, —NR$^5$—, —CR$^5$R$^6$—, —CR$^5$=CR$^6$— or —CR$^5$=N—;

p, q and r are identical or different and are 0 or 1 to 5;

R$^1$, R$^2$, R$^3$, R$^4$, R$^5$, R$^6$, R$^7$ and R$^8$ are identical or different and are H, a straight-chain or branched alkyl, alkoxy or ester group having 1 to 22 carbon atoms, aryl and/or aryloxy groups, preferably phenyl and/or phenyloxy groups, in which the aromatic can be substituted by C$_1$–C$_{22}$-alkyl, C$_1$–C$_{22}$-alkoxy, Br, Cl, F, CN and/or NO$_2$, or Br, Cl, F, CN, NO$_2$ or CF$_3$;

L and M are identical or different and are H or, preferably, groups of the formulae

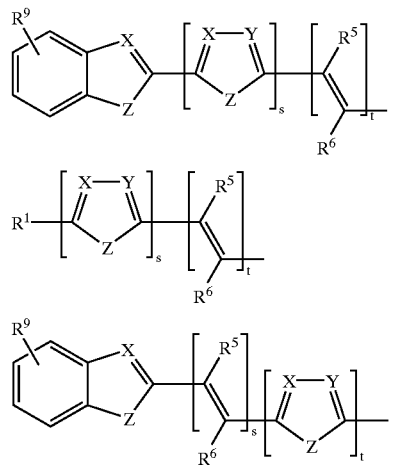

-continued

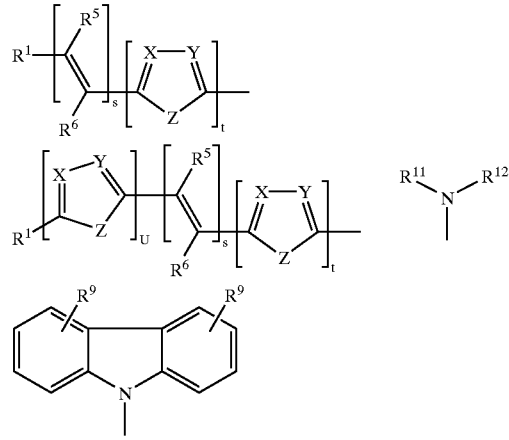

R$^9$ is identical or different and is H, an unbranched or branched alkyl or alkoxy group having 1 to 22 carbon atoms, —CN, —NO$_2$, —NR$^{11}$R$^{12}$, phenyl, biphenyl, 1-naphthyl, 2-naphthyl, 2- thienyl and 2-furanyl, where the aryls and heteroaryls can carry a further substituent R$^9$;

X and Y are identical or different and are =CR$^5$— or =N—;

Z is identical or different and is —O—, —S—, —NR$^{11}$—, CR$^5$R$^6$, —CR$^5$=CR$^6$— or —CR$^5$=N—; and R$^{11}$ and R$^{12}$ are identical or different and are H, an unbranched or branched alkyl group having 1 to 22 carbon atoms, phenyl, 3-methylphenyl, biphenyl, 1-naphthyl or 2-naphthyl;

s, t, u are identical or different 0, 1, 2, 3, 4 or 5.

Particularly preferred polymers, comprising repeating units of the formula (VII), are those in which:

Q and K are a group of the following formulae

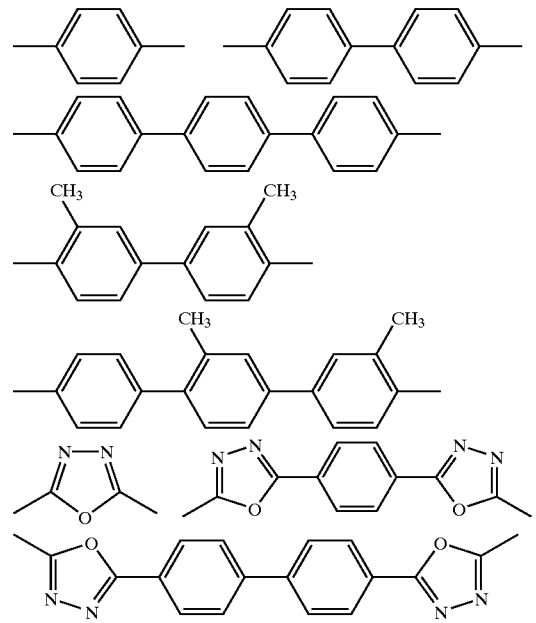

-continued
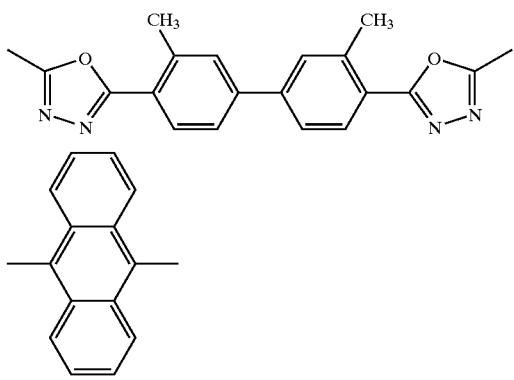
m and n are identical or different and are 0 or 1;
L and M are identical or different and are H or, preferably, a group of the formulae
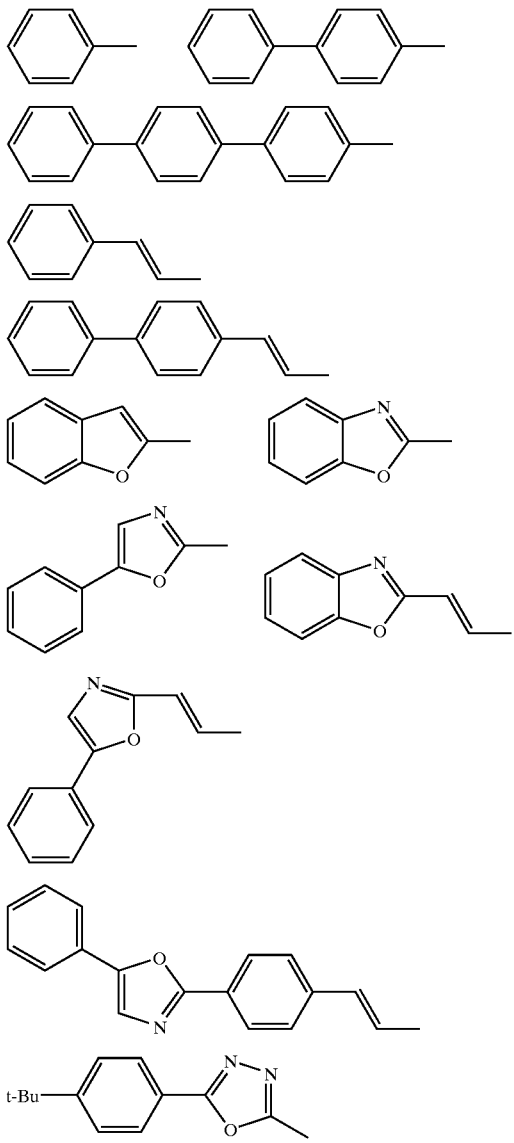
-continued
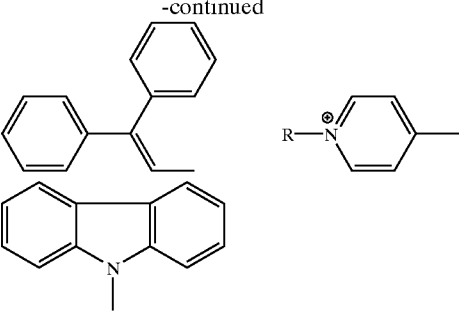
R=alkyl or $C_2H_4SO_3$—
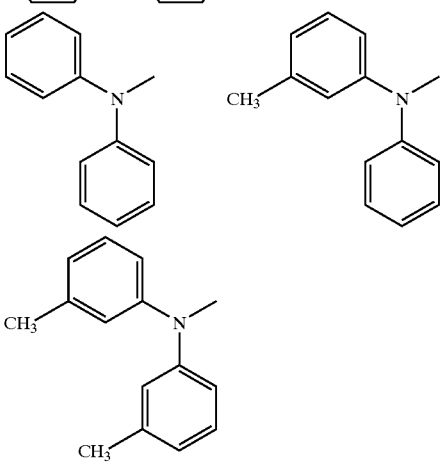
Especially preferred compounds of the formula (VII) are the following, in which:
Q and K are identical or different and in each case are a group of the formulae
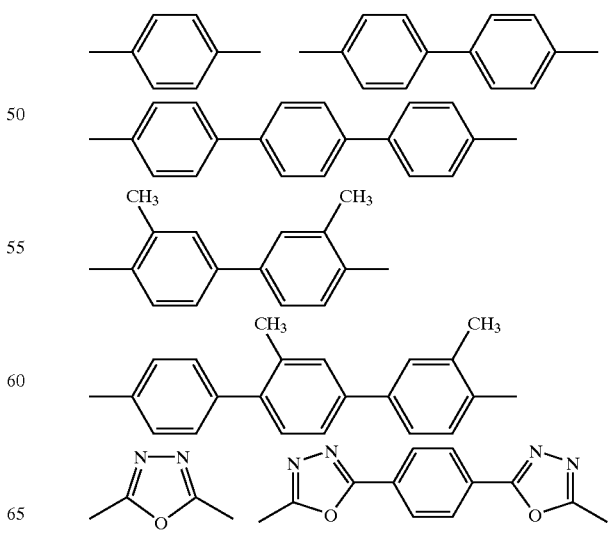

-continued

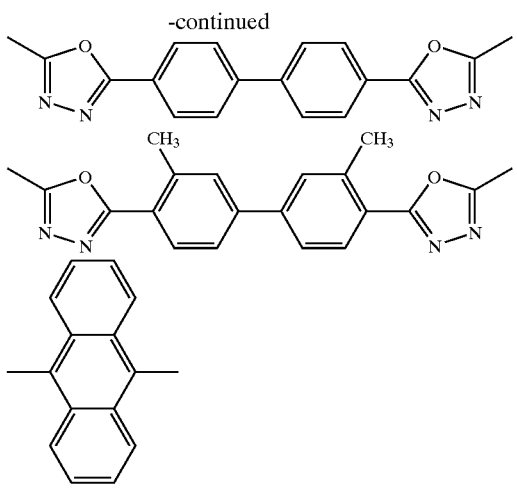

m+n is 0 or 1; and
L and M are identical or different and in each case are H or, preferably, a group of the formulae

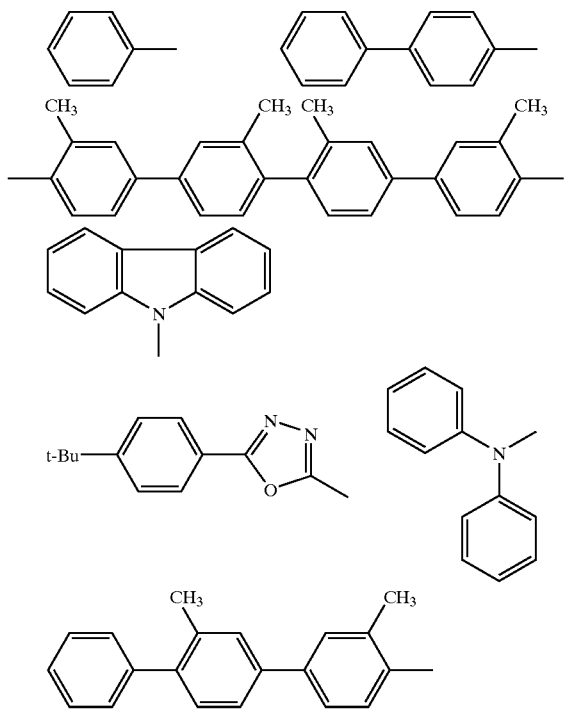

For some applications, it may be advantageous to replace one, several or all the hydrogen atons, preferably aromatic hydrogen atoms, by F atoms.

The polymers, comprising repeating units of the formulae (VI) and (VII), are homo- or copolymers, i.e. they can also contain different repeating units of the type mentioned. This type of spiro compound can be prepared, for example, by the following route:

Starting compounds which are employed for the preparation of these polymers are in general monomers having a 9,9'-spirobifluorene center which are substituted in the 2,7- and optionally 2',7'-position.

Methods for the synthesis of the monomers are based, for example, on the synthesis of 9,9'-spirobifluorene, for example from 2-bromobiphenyl and fluorenone via a Grignard synthesis, such as described by R. G. Clarkson, M. Gomberg, *J. Am. Chem. Soc.*, 1930, 52, 2881, the product subsequently being further substituted in a suitable manner.

Functionalizations of 9,9'-spirobifluorene are described, for example, in J. H. Weisburger, E. K. Weisburger, F. E. Ray, *J. Am. Chem. Soc.*, 1959, 72, 4253; F. K. Sutcliffe, H. M. Shahidi, D. Paterson, *J. Soc. Dyers Colour*, 1978, 94, 306; and G. Haas, V. Prelog, *Helv. Chim. Acta*, 1969, 52, 1202.

The desired substitution pattern of the 9,9'-spirobifluorene monomer is obtained in a considerably more favorable manner if the spiro linkage already takes place starting from suitably substituted educts, for example with 2,7-difunctionalized fluorenones, and the still free 2',7'-positions are then optionally further functionalized (for example by halogenation or acylation, with subsequent C—C linkage after conversion of the acetyl groups into aldehyde groups, or by build-up of the heterocyclic radical after conversion of the acetyl groups into carboxylic acid groups) after the spiro center has been built up.

Further functionalization can be carried out by methods known per se from the literature, such as are described in standard works on organic synthesis, for example Houben-Weyl, *Methoden der Organischen Chemie* [Methods of Organic Chemistry], Georg-Thieme Verlag, Stuttgart and in the corresponding volumes of the series *The Chemistry of Heterocyclic Compounds*, A. Weissberger and E. C. Taylor (editors).

For synthesis of the groups A, B, C and D, reference may be made, for example, to DE-A 23 44 732, 24 50 088, 24 29 093, 25 02 904, 26 36 684, 27 01 591 and 27 52 975 for compounds with 1,4-phenylene groups; DE-A 26 41 724 for compounds with pyrimidine-2,5-diyl groups; DE-A 40 26 223 and EP-A 03 91 203 for compounds with pyridine-2, 5-diyl groups; DE-A 32 31 462 for compounds with pyridazine-3,6-diyl groups; and N. Miyaura, T. Yanagi and A. Suzuki in *Synthetic Communications*, 1981, 11, 513 to 519, DE-A 39 30 663, M. J. Sharp, W. Cheng, V. Snieckus, *Tetrahedron Letters*, 1987, 28, 5093; G. W. Gray, *J. Chem. Soc. Perkin Trans., II* 1989, 2041 and *Mol. Cryst. Liq. Cryst.*, 1989, 172, 165; *Mol. Cryst. Liq. Cryst.*, 1991, 204, 43 and 91; EP-A 0 449 015; WO 89/12039; WO 89/03821; and EP-A 0 354 434 for direct linkage of aromatics and heteroaromatics.

The preparation of disubstituted pyridines, disubstituted pyrazines, disubstituted pyrimidines and disubstituted pyridazines is to be found, for example, in the corresponding volumes of the series *The Chemistry of Heterocyclic Compounds*, A. Weissberger and E. C. Taylor (editors).

Starting from the above-mentioned monomers, polymerization to give the polymers according to the invention is possible by several methods.

For example, derivatives of 9,9'-spirobifluorene can be polymerized oxidatively (for example with FeCl$_3$, cf., inter alia, P. Kovacic, N. B. Jones, *Chem. Ber.*, 1987, 87, 357 to 379; and M. Weda, T. Abe, H. Awano, *Macromolecules*, 1992, 25, 5125) or electrochemically (cf., for example, N. Saito, T. Kanbara, T. Sato, T. Yamamoto, *Polym. Bull.*, 1993, 30, 285).

The polymers according to the invention can likewise be prepared from 2,7-difunctionalized 9,9'-spirobifluorene derivatives.

Dihaloaromatics can be polymerized under copper/triphenylphosphane (cf., for example, G. W. Ebert, R. D. Rieke, *J. Org. Chem.*, 1988, 53, 4482) or nickel/triphenylphosphane catalysis (cf., for example, H. Matsumoto, S. Inaba, R. D. Rieke, *J. Org. Chem.*, 1983, 48, 840).

Aromatic diboron acids and aromatic dihalides or mixed aromatic halogen-boron acids can be polymerized by coupling reactions under palladium catalysis (cf., for example, M. Miyaura, T. Yanagi, A. Suzuki, *Synth. Commun.*, 1981, 11, 513; and R. B. Miller, S. Dugar, *Organometallics*, 1984, 3, 1261).

Aromatic distannanes can be polymerized under palladium catalysis, for example as described by J. K. Stille, *Angew. Chem. Int.*, English edition 1986, 25, 508.

Furthermore, the above-mentioned dibromine compounds can be converted into the dilithio or di-Grignard compounds, which are then polymerized with further dibromine compound by means of $CuCl_2$ (Cf., for example, G. Wittig, G. Klar, *Liebigs Ann. Chem.*, 1967, 704, 91; H. A. Stabb, F. Bunny, *Chem. Ber.*, 1967, 100, 293; and T. Kaufmann, *Angew. Chem.*, 1974, 86, 321 to 354) or by electron transfer of unsaturated 1,4-dihalogen compounds (cf., for example, S. K. Taylor, S. G. Bennett, K. J. Harz, L. K. Lashley, *J. Org. Chem.*, 1981, 46, 2190).

However, the polymers, comprising repeating units of the formula (VI), can also be synthesized by polymerization of a 2,7-difunctionalized 9,9'-spirobifluorene derivative with another suitably difunctionalized compound.

Thus, for example, 2,7-dibromo-9,9'-spirobifluorene can be polymerized with 4,4'-biphenylylbis-boron acid. In this manner, at the same time as the polymerization step, the build-up of various heterocyclic units is possible, such as, for example, the formation of oxadiazole units from difunctional carboxylic acid halides and difunctional carboxylic acid hydrazides, or from the corresponding dicarboxylic acid and hydrazine sulfate (B. Schulz, E. Leibnitz, *Acta Polymer*, 1992, 43, 343; and JP 05/178,990 [93,178,990]), or alternatively from dicarboxylic acid halides and bistetrazoles (C. A. Abshire, C. S. Marvel, *Makromol. Chem.*, 1961, 44 to 46, 388).

To prepare copolymers, for example, different monomers, comprising structural units of the formula (VI) or (VII) can be polymerized together.

Working up is carried out by known methods with which the expert is familiar, such as are described, for example, by D. Braun, H. Cherdron, W. Kern, *Praktikum der makromolekularen organischen Chemie* [Practical Macromolecular Organic Chemistry], 3rd edition, Huthig Verlag, Heidelberg, 1979, page 87 et seq. For example, the reaction mixture can be filtered, diluted with aqueous acid and extracted and the crude product obtained after drying and stripping off the solvent can be further purified by reprecipitation.

Terminal bromine atoms can be removed reductively, for example with $LiAlH_4$ (cf., for example, J. March, *Advanced Organic Chemistry.*, 3rd edition. McGraw-Hill, page 510).

The synthesis of the described polymers is also described in EP-A 0 707 020; WO-A 96/17036; DE-A 196 06 511; DE-A 196 14 971 and DE-A 196 15 128.

On the basis of the above-mentioned properties of these spiro compounds, such as solubility, stability and amorphous structures, with a simultaneous good non-linear optical activity and low optical losses, the spiro compounds described above are especially suitable as a material in non-linear optics. They are especially suitable for the exploitation of third order non-linearly optical effects.

Therefore, according to a further aspect of the present invention there is provided a non-linearly optical structural element, which comprises or consists of a monomeric or polymeric spiro compound as described above. Preferably, non-linearly optical effects of the third order are exploited in this structural element.

According to a further aspect of the present invention there is provided a non linearly optical structural element, which comprises an optical waveguide comprising or consisting of a monomeric or polymeric spiro compound as described above. Preferably this non-linearly optical structural element is an opto-optical coupler, a Mach-Zehnder interferometer, a mode selective coupler or a prism coupler.

The invention is explained in more detail by the following examples.

EXAMPLES

The non-linear susceptibility of the 3rd order determined in the examples was determined by the method of so-called frequency tripling on a layer. Frequency tripling is a special case of 4-wave mixing in which the frequency of the fourth wave forms the sum of the frequencies of the first three waves, which all have the same frequency. As a result, a wave with three times the frequency is generated, for example a laser beam at 1064 nm generates a harmonic wave at 355 nm. By measuring the intensity of the light of tripled frequency, the susceptibility of the 3rd order of the substance can be determined. The measurement setup is described below.

To generate light pulses of the fundamental wavelength, an actively/passively mode-coupled Nd-YAG laser which was pumped by flashlamp and was operated at a wavelength of 1064 nm and a pulse rate of 10 Hz was used. An optical parametric oscillator was employed for the measurements at 1500 nm.

The beam was divided into two measurement branches of almost identical structure with the aid of a beam guide. In sample branch A, the laser beam was focused on the sample with a lens of long focal length. This sample was mounted on a rotary adjustment unit controlled by a stepping motor and with a perpendicular axis of rotation. The sample set-up was accommodated in a cell which can be evacuated. The harmonic light generated in the sample was focused on the entry slit of a grating monochromator. The wavelength-selected light was detected with a photomultiplier and a Boxcar amplifier (gated integrator).

Several filters were used to regulate the beam intensities. The energy incident on the sample was attenuated in a defined manner with the aid of neutral filters.

To suppress harmonic light generated even in front of the sample, the neutral filters were followed by an RG 850 cutoff filter. Behind the sample, the laser beam was absorbed in a KG 3 filter. Damage to the subsequent lens by the high beam intensities was avoided in this way.

The reference branch constructed in parallel was used for compensation of the pulse-to-pulse variations of the laser intensity. For this purpose, harmonic light was generated in a suitable sample and detected as described above. The measurement signal generated per laser pulse in the sample branch was then divided by the signal generated in the reference branch by means of an analog function generator.

To determine the non-linearly optical susceptibilities, the harmonic signal in transmission was recorded as a function of the angle of rotation θ of the sample relative to the beam axis.

The optical damping (in dB/cm) describes the optical losses in a beam guide, and is the rate at which the intensity of the guided light decreases within the waveguide, and is influenced by light scattering and absorption.

To determine the optical damping, the intensity of the light scattered out of the waveguide was measured. An optical fiber was mounted a small distance from the waveguide and led along the guided light. Some of the guided light couples in the fiber and is measured with a photodiode as a function of the location. Assuming a uniform distribution of the scatter centers, the scattered intensity (I) was proportional to the intensity of the guided beam and decreases exponentially in accordance with Beer's law. The plot of (I) against the position of the optical fiber gave a straight line, from the gradient of which the damping coefficient α was determined.

Example 1

Synthesis of 2,2',4,4',7,7'-hexabromo-9,9'-spirobifluorene 200 mg of anhydrous FeCl3 were added to a solution of 3.16 g (10 mmol) of 9,9'-spirobifluorene in 20 ml of methylene chloride and the mixture was treated with ultrasound. The reaction flask was protected against the entry of light with Al foil. 9.85 g (3.15 ml, 62 mmol) of bromine in 5 ml of methylene chloride were then added dropwise at the boiling point in the course of 15 minutes. The solution was boiled under reflux for a further 20 hours and treated with ultrasound. After cooling, petroleum ether was added and the solid was filtered off with suction. For further purification, it was recrystallized from tetrahydrofuran/methanol and dried at 80° C. for 5 hours. Yield of 6.15 g (77%) of colorless crystals.

Example 2

Synthesis of 2,2',4,4',7,7'-hexabiphenylyl-9,9'-spirobifluorene 1.6 g of hexabromospirobifluorene and 3 g of biphenylboronic acid were suspended in a mixture of 50 ml of toluene and 50 ml of 1 M potassium carbonate solution in a 250 ml two-necked flask with a reflux condenser and precision glass stirrer. The mixture was boiled under reflux under nitrogen, and 115 mg of tetrakis(triphenylphosphine) palladium in 5 ml of toluene were added. The mixture was boiled under reflux for 7 hours, while stirring. When the reaction had ended, the cooled solution was filtered off and the filtrate was extracted 2x by shaking with water (chloroform was added for better phase separation). The organic phase was dried over sodium sulfate and filtered over a short column with silica gel and the solvent was then stripped off on a rotary evaporator. For further purification, the product was recrystallized from methylene chloride/pentane. 2 g (80%) of colorless crystals which fluoresce blue under UV illumination were obtained.

$^{13}$C-NMR [360 MHz.; ATP, broad-band decoupling] (CDCl$_3$, ppm): 65.94 (1C, spiro-C); 126.95 (6C, CH), 126.97 (6C, CH), 127.17 (6C, CH), 127.35 (6C, CH), 127.36 (6C, CH), 127.39 (6C, CH), 127.52 (6C, CH), 128.73 (6C, CH), 128.75 (6C, CH), 128.94 (6C, CH), 129.90 (4C, CH), 137.77 (2C), 137.86 (2C), 139.43 (2C), 139.69 (2C), 139.89 (2C), 140.09 (2C), 140.17 (2C), 140.22 (2C), 140.30 (2C), 140.63 (2C), 140.64 (2C), 140.68 (2C), 140.72 (2C), 140.74 (2C), 150.45 (2C), 150.92 (2C).

Example 3

The compound described in Example 2 (spiro 1) was dissolved in chlorobenzene (concentration of 50 mg/ml). The layers were centrifuged onto quartz glass carriers of size 25×37.5×1 mm at 2000 revolutions per minute. The layer thickness in this case was about 50 nm. The coated carriers were mounted in an apparatus for determination of the non-linearly optical susceptibility of the 3rd order by frequency tripling. At an excitation wavelength of 1064 nm, a non-linear optical susceptibility of about $10^{-10}$ esu was measured. At an excitation wavelength of 1500 nm, a value of about $10^{-11}$ esu was measured.

Example 4

The compound described in Example 2 (spiro 1) was applied by thermal vapor deposition in vacuo onto a quartz glass carrier of size 25×37.5×1 mm. The layer thickness in this case was about 400 nm. The sample was mounted in a measurement set-up for waveguide mode spectroscopy with a light source of 633 nm and the damping was measured. A damping of 2 dB/cm was measured for the TEO mode.

Example 5

Synthesis of 2,7-dibromo-9,9'-spirobifluorene

A Grignard reagent prepared from 0.72 g (30 mmol) of magnesium turnings and 5.1 ml (30 mmol) of 2-bromobiphenyl in 15 ml of diethyl ether was added dropwise to a boiling suspension of 10.0 g (29.6 mmol) of 2,7-dibromo-9-fluorenone in 100 ml of dry diethyl ether in the course of 2 hours, while stirring (in an ultrasonic bath). When the addition had ended, the mixture was boiled for a further 3 hours. After cooling overnight, the precipitate which had separated out was filtered off with suction and washed with cold ether. The magnesium complex which had been filtered off with suction was hydrolyzed in a solution of 15 g of ammonium chloride in 250 ml of ice-water. After 1 hour, the 9-(2-biphenylyl)-2,7-dibromo-9-fluorenol formed was filtered off with suction, washed with water and sucked dry. For the cyclization reaction, the dried fluorenol was boiled in 100 ml of glacial acetic acid, after addition of 3 drops of concentrated hydrochloric acid, for 6 hours. The mixture was left to crystallize overnight and the product formed was filtered off with suction and washed with glacial acetic acid and water.

Yield: 11 g (77%) of 2,7-dibromo-9,9'-spirobifluorene. For further purification, the product could be recrystallized from tetrahydrofuran.

$^1$H-NMR (CDCl$_3$, ppm): 6.73 (d, J=7.63 Hz, 2 H, H-1',8'); 6.84 (d, J=1.83 Hz, 2 H, H-1, 8); 7.15 (td, J=7.63, 1.22 Hz., 2 H, H-2',7'); 7.41 (td, J=7.63, 1.22 Hz, 2 H, H-3',6'); 7.48 (dd, J=8.24, 1.83 Hz, 2 H, H-3, 6); 7.67 (d, J=8.24; 2 H; H-4, 5); 7.85 (d, J=7.63, 2 H, H-4',5').

Example 6

Synthesis of 2,7-dicarbethoxy-9,9'-spirobifluorene

A Grignard reagent prepared from 0.97 g (40 mmol) of magnesium turnings and 9.32 g (6.8 ml, 40 mmol) of 2-bromobiphenyl in 50 ml of dry diethyl ether was added dropwise to a boiling solution of 13 g (40 mmol) of 2,7-dicarbethoxy-9-fluorenone in 100 ml of dry diethyl ether in the course of 2 hours. When the addition had ended, the mixture was boiled for a further 3 hours. After cooling overnight, the precipitate which had separated out was filtered off with suction and washed with cold ether. The magnesium complex which had been filtered off with suction was hydrolyzed in a solution of 15 g of ammonium chloride in 250 ml of ice-water. After 1 hour, the 9-(2-biphenylyl)-2,7-dicarbethoxy-9-fluorenol formed was filtered off with suction, washed with water and sucked dry. For the cyclization reaction, the dried fluorenol was boiled in 100 ml of glacial acetic acid, after addition of 3 drops of concentrated hydrochloric acid, for 6 hours. The mixture was left to crystallize overnight and the product formed was filtered off with suction and washed with glacial acetic acid and water.

Yield: 15.1 g (82%) of 2,7-dicarbethoxy-9,9'-spirobifluorene. For further purification, the product can be recrystallized from ethanol.

$^1$H-NMR (CDCl$_3$, ppm): 1.30 (t, J=7.12 Hz, 6 H, ester-CH$_3$); 4.27 (q, J=7.12 Hz, 4 H, ester-CH$_2$); 6.68 (d, J 7.63 Hz, 2 H, H-1', 8'); 7.11 (td, J=7.48, 1.22 Hz, 2H, H-2', 7'); 7.40 (td, J=7.48, 1.22 Hz, 4 H, H-1, 8', 3', 6'); 7.89 (dt, J=7.63, 0.92 Hz, 2 H, H-4', 5'); 7.94 (dd, J=7.93, 0.6 Hz, 2 H, H-4, 5); 8.12 (dd, J=7.93, 1.53 Hz, 2 H, H-3, 6).

Example 7

Polymerization of 2,7-dibromo-9,9'-spirobifluorene with Ni(0) by the Yamamoto method to give poly-2,7-(9,9'-spirobifluoren)ylene (polymer 1)

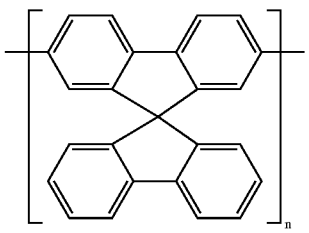

A solution of 1.517 g of 2,7-dibromo-9,9'-spirobifluorene in 30 ml of dry tetrahydrofuran was prepared under argon and heated to 60° C. The hot solution was added rapidly under an inert gas to a mixture, which was boiling under reflux and was also under an inert gas, of 825 mg of Ni(cod)$_2$, 470 mg of 2,2'-bipyridyl and 0.4 ml of 1,5-cyclooctadiene (COD) in 20 ml of dry tetrahydrofuran. The polymerization started immediately, the deep-blue reaction mixture becoming red in color. The mixture was allowed to boil further under reflux for 6 hours and was then cooled to room temperature. The red-colored polymer was filtered off with suction and washed with tetrahydrofuran and also dilute hydrochloric acid and water.

A first soluble polymer fraction was isolated by extraction with 200 ml of chloroform (further soluble fractions can be isolated by extraction, for example, with 1,2-dichloroethane and 1-chloronaphthalene), and was purified by extraction by shaking with ethylenediaminetetraacetic acid (aqueous solution brought to pH 7 to 8 3× with ammonia, 1× pH 3) and subsequent extraction by shaking with dilute hydrochloric acid and water. The dried chloroform solution was concentrated to 10 ml and the polymer was precipitated by dropwise addition into 70 ml of methanol. The resulting polymer was yellowish in color. $^1$H-NMR (CDCl$_3$, ppm): 6.63–6.68 (2H, H-1,8); 6.71–6.75 (2H, H-1',8'); 7.00–7.10 (2H, H-2', 7'); 7.21–7.38 (4H, H-3,3',6,6'); 7.59–7.70 (2H, H-4',5'); 7.75–7.82 (2H, H4,5).

Example 8

The polymeric compound described in Example 7 (spiro 2) was dissolved in chlorobenzene (concentration of 30 mg/ml). The layers were spin-coated onto quartz glass carriers of size 25×37.5×1 mm at 3000 revolutions per minute. The layer thickness in this case was about 50 nm. The coated carrier was mounted in an apparatus for determination of the non-linear optical susceptibility of the 3rd order by frequency tripling. At an excitation wavelength of 1064 nm, a non-linear optical susceptibility of about $10^{-10}$ esu was measured. At an excitation wavelength of 1500 nm, a value of about $10^{-11}$ esu was measured.

Example 9

The polymeric compound described in Example 7 (spiro 2) was dissolved in chlorobenzene (concentration: 100 mg/ml). The layers were spin-coated onto quartz glass carriers of size 25×37.5×1 mm at 700 revolutions per minute. The layer thickness in this case was about 400 nm.

The sample was mounted in a measurement set-up for waveguide mode spectroscopy with a light source of 633 nm and the damping was measured. A damping of less than 2 dB/cm was measured for the TEO mode.

What is claimed is:

1. The non-linearly optical structural element, selected from the group consisting of opto-optical couplers, Mach-Zehnder interferometers, mode selective couplers and prism couplers, which comprises an optical waveguide comprising a spiro compound of the formula (I)

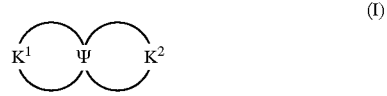

(I)

in which ψ is C, Si, Ge or Sn, and K$^1$ and K$^2$ independently of one another are conjugated systems or a conjugated polymer, comprising repeating units of the formula (VI),

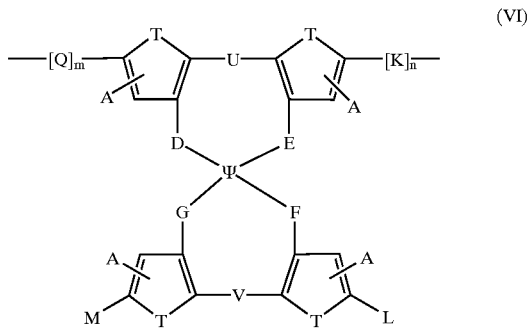

(VI)

in which the symbols and indices have the following meanings:

m and n are 0, 1, 2, or 3;

ψ is Sn, Ge, Si or C;

D, E, F and G are identical or different and are —CR$^1$R$^2$—, —O—, —S—, —NR$^3$— or a chemical bond; in which R$^1$, R$^2$ and R$^3$ are C$_1$–C$_{20}$-alkyl or H, and in which R$^1$ and R$^2$ together can form an optionally substituted cycloalkyl ring;

U is —CR$^4$═CR$^5$— or a chemical bond;

V has the meaning of U or is —CR$^1$R$^2$—, —O—, —S—, —NR$^3$—, —SiR$^1$R$^2$—, —SO$_2$—, —SO— or —CO—, in which R$^1$, R$^2$ and R$^3$ have the above-mentioned meaning and R$^4$ and R$^5$ have the meaning of R$^1$, R$^2$ and R$^3$ or are fluorine or CF$_3$;

A is hydrogen, C$_1$–C$_{20}$—, alkyl, which can also contain heteroatoms;

R$^6$ and R$^7$ are hydrogen or a C$_1$–C$_{20}$-hydrocarbon radical, which can be aliphatic, aromatic, linear, branched or alicyclic, in which R$^6$ together with R$^7$ can form a ring, T is —O—, —S—, —NR$^3$—, —CR$^1$R$^2$—, —CH═N—, —CA═CA—, —CH═CA—, —CH═CF— or —CF=CF—, in which $R^1$, $R^2$, $R^3$ and A have the above-mentioned meaning, K, L, M and Q are identical or different hydrocarbon radicals which contain conjugated electron systems and can contain heteroatoms, where K, L, M and Q, with the particular groups A in the ortho-position, can also be closed together to form a ring, which is saturated, partly unsaturated or unsaturated to the maximum degree, L, M can also be H, a non-conjugated hydrocarbon radical, preferably containing 1 to 20 carbon atoms, which can contain hetero atoms, halogen, CN, $NO_2$, an amino, alkylamino or dialkylamino group.

\* \* \* \* \*